Aug. 26, 1952  F. T. JENKINS  2,608,258
POWER HAND TRUCK
Filed April 19, 1948  3 Sheets-Sheet 1
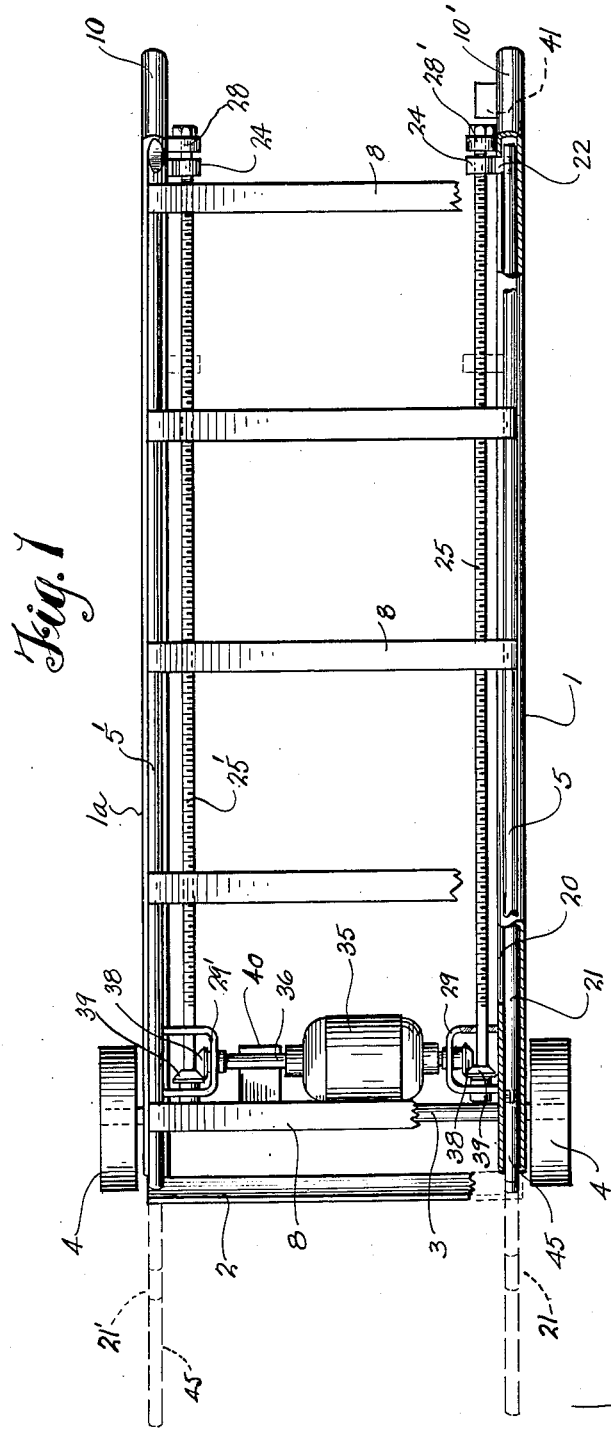
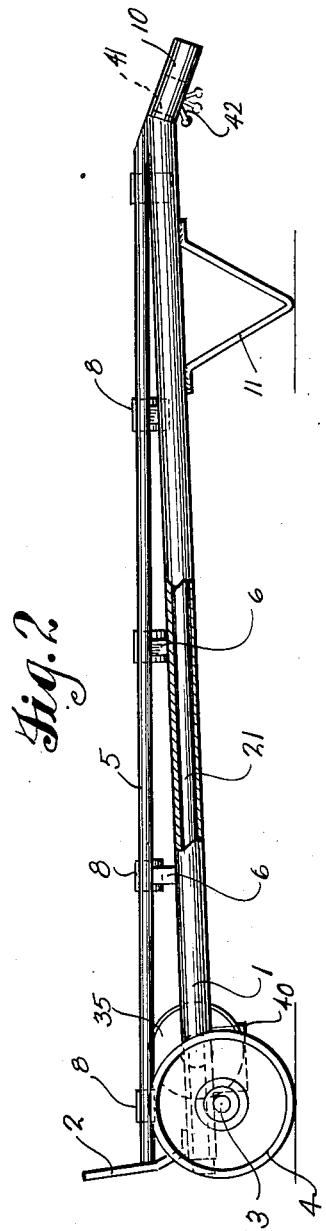
INVENTOR.
FREDRICK T. JENKINS
BY
ATTORNEYS Aug. 26, 1952 F. T. JENKINS 2,608,258
POWER HAND TRUCK
Filed April 19, 1948 3 Sheets-Sheet 2
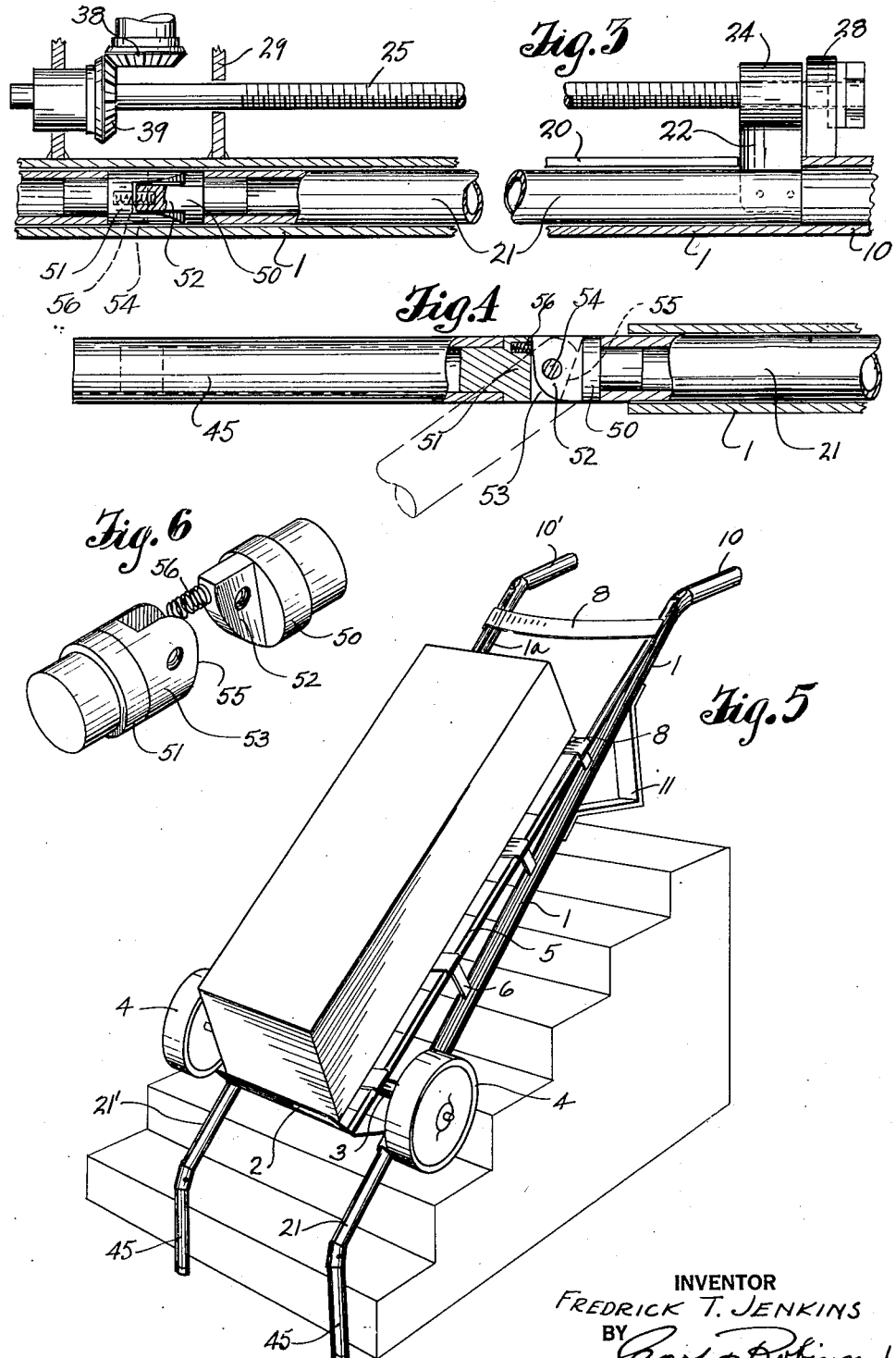
INVENTOR
FREDRICK T. JENKINS
BY
Cook & Robinson
ATTORNEY

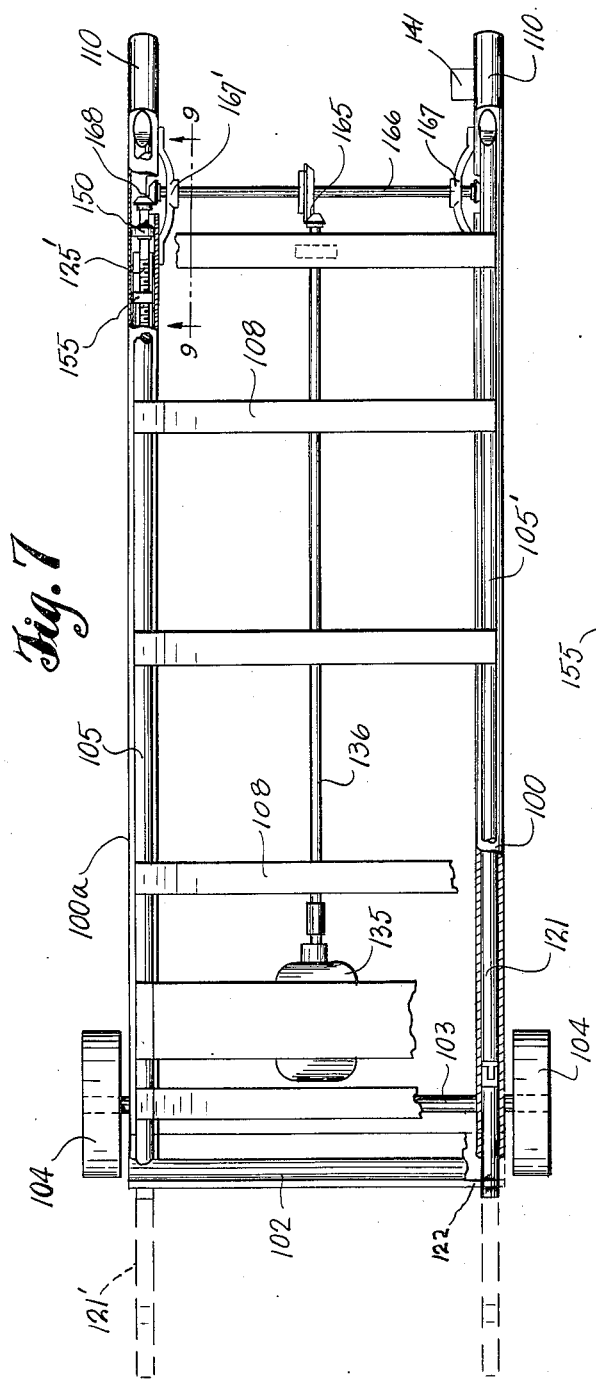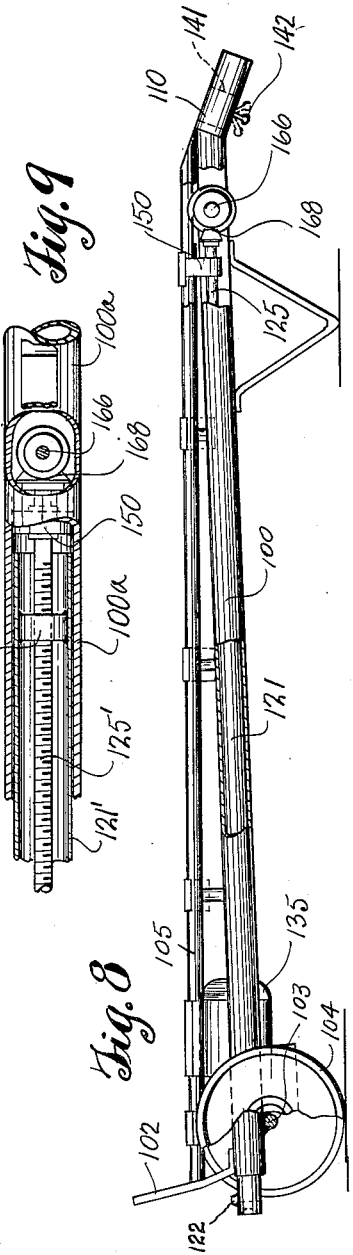

Patented Aug. 26, 1952

2,608,258

UNITED STATES PATENT OFFICE 2,608,258

POWER HAND TRUCK

Fredrick T. Jenkins, Seattle, Wash.

Application April 19, 1948, Serial No. 21,772

3 Claims. (Cl. 180—8)

This invention relates to improvements in hand trucks to those types now quite extensively used for the manual trucking of heavy articles such, for example trunks, boxes, refrigerators, paper rolls, sacked materials, packages, and the like, that are too heavy or bulky for handling or carrying by hand; it being the principal object of the invention to provide an improved hand truck, that may be used in the normal manner of use of hand trucks in general, as employed in freight stations, at docks and in warehouses, and which includes in connection therewith, a power unit and devices operable thereby, whereby the truck and load thereon may be bodily elevated or lowered from one level to another as, for instance, to lift the truck from a platform into a freight car or to lower it from a car onto a floor.

More specifically stated, the present invention resides in the provision of a hand truck comprising a wheel and handle equipped frame structure which adapts the device to normal manual load moving operations, and also a power unit and a pair of extendable and retractable legs that are adjustable from and into the main frame and operatively connected with the power unit for actuation thereby, and which legs may be extended from the lower end of the truck into lifting contact with a surface and the truck and its load lifted from one level to another, or similarly used when extended as a means for the controlled lowering of a heavy load from one level to another.

It is also an object of the invention to equip the load lifting legs of the truck with short, hingedly attached extension members that have limited hinging action that makes possible an easier use of the legs, particularly when loads are being handled on stairways.

It is a further object of the invention to provide a hand truck of the character above stated wherein the power unit can be retained under control of the person handling the truck and is reversible to provide for the controlled lifting and lowering of loads.

In accomplishing these and other objects of the invention, I have provided the improved details of construction, the preferred forms of which are illustrated in the accompanying drawings, wherein:

Fig. 1 is a plan view of a truck embodying the features of the present invention therein, some parts being broken away or shown in section for better illustration.

Fig. 2 is a side view of the same, with certain parts broken away for better understanding.

Fig. 3 is a longitudinal, sectional detail of a portion of one of the leg mounting tubes, and showing the leg as contained therein and its means of connection with the adjusting shaft.

Fig. 4 is a fragmental, sectional detail of the extension member at the lower end of one of the legs.

Fig. 5 illustrates the method of using the extension legs for elevating the truck and its load up a stairway.

Fig. 6 is a detail in perspective of the leg hinge.

Fig. 7 is a plan view of a truck embodying an alternative arrangement of leg adjusting means and driving connections with the motor; parts being broken away for better illustration.

Fig. 8 is a side view of the same.

Fig. 9 is a sectional detail of part of the driving connection taken on the line 9—9 in Fig. 7.

Referring more in detail to the drawings:

In one of its present forms of construction, as shown in Figs. 1 to 6 inclusive, the truck embodied by this invention comprises a main frame structure including paired longitudinal, opposite side members 1 and 1a, of tubular form, and which are parallel, coextensive, and disposed in the same plane. These members are rigidly connected across the lower end of the truck, by means of a toe or nose plate 2, which extends upwardly in a plane that is substantially at a right angle to the plane of the side members 1 and 1a as noted best in Fig. 2. Also, a cross axle 3 is fixed by welding or other suitable means, to the side members, at their under sides and near their lower ends, and this cross shaft is equipped at its ends with ground wheels 4—4 as best shown in Fig. 1.

Extending longitudinally of the main frame, at its opposite sides, and directly above the parts 1 and 1a, are truss rods 5—5', which have lower ends welded or otherwise fixed to opposite sides of the toe plate 2, and at their upper ends are welded to the upper end portions of the corresponding members 1 and 1a. At intervals along their lengths, ties or straps 6 join the members 1 and 1a with the corresponding truss rods 5 and 5' to add strength and rigidity to the frame structure, and also there are a number of cross straps 8 extended between the rods 5 and 5' at spaced intervals along their lengths to give strength and rigidity to the structure and to serve with the toe or cross plate 2 as the load supporting means, as will be understood by reference to Fig. 5.

It is preferred that the rods 5 and 5' be spaced somewhat at their lower ends from the corresponding side members 1 and 1a and converged to the side members at their upper ends. Also, it is desirable as here shown, that the upper ends of the members 1 and 1a be extended beyond the ends of rods 5—5' and slightly downwardly turned to form handle members 10—10' for convenience in the handling of the truck. The cross straps 8 are preferably downwardly bowed between their ends to aid in retaining an article on the truck.

It is also desirable that the frame be equipped near its upper end and at opposite sides with legs, as at 11 in Fig. 2, adapted to coact with the truck wheels 4 to provide for supporting the frame at rest in substantially a horizontal position as shown in Fig. 2, when such is desired.

The main feature of the present invention resides in the provision of a power unit on the truck and means operatively connected therewith whereby the truck, as normally supported by a workman with load thereon, may be bodily elevated. There are various ways in which this might be effected. One means which I have herein shown is described as follows; reference being directed particularly to Figs. 1 and 2.

Each of the longitudinal frame members 1 and 1a is straight and tubular, and is open from end to end. Also, each of these frame parts is provided, from near its upper end to near its lower end, at the inside, with a longitudinal slot 20 as best shown in Fig. 3. Telescopically contained in the tubular members 1 and 1a, respectively, are shafts 21—21' serving as the frame lifting legs and adapted to be moved from positions retracted entirely within the tubular members, as in Fig. 1, to positions extended from their lower ends, for example, as has been shown in Fig. 5.

Shafts 21 and 21' are each equipped at their upper ends with a lateral flange 22, rigidly fixed thereto, and extended through and movable along the corresponding tube slot, and on the outer end of this flange a nut 24 is rigidly fixed.

Extended along, and parallel with the tubular members 1 and 1a at the inside thereof, are shafts 25—25', each of which is threaded substantially to its full length and is threaded through the nut 24 which is at the corresponding side of the frame. These shafts, respectively, are formed with right hand and left hand threads. At their upper ends, the shafts 25—25' are revolubly fixed in bearings 28—28' fastened to the upper ends of the frame parts 1 and 1a and at their lower ends are revolubly mounted in brackets 29—29' of yoke-like form that are welded to the frame members 1 and 1a, near the toe plate 2 as shown in Fig. 1.

Supported between the side members of the truck frame, below the bed, near its lower end, and attached to axle 3, is an electric motor 35 with opposite end portions of its drive shaft 36 extended to opposite sides of the frame and revolubly contained in the brackets 29—29'. Fixed on the motor shaft ends are bevel gears 38 in mesh with bevel gears 39 that are keyed on the threaded shafts 25—25'. Thus, when the motor is energized, it will operate to rotate the shafts 25—25' in unison and thus cause the nuts 24 to travel therealong. The shafts 21—21' will be moved endwise with the shifting of the nuts 24, and according to the direction of rotation of the motor, can be extended substantially to their full lengths from the lower ends of the tubular frame members 1 and 1a, or can be fully retracted.

The motor 35 is of the reversible type and is under control of a reversing switch mechanism of common type designated generally at 40, and this is controlled by a switch 41 located in the handle 10 as in Fig. 2 and having a handle 42 movable between "on" positions for up or down travel and an "off" position. Electrical current may be brought to the motor through the unit 40 by extension cord or otherwise.

To facilitate the use of the device on stairways and the like, the shafts 21—21', which constitute the lifting legs for the frame, are equipped at their lower ends with short extension portions or "spuds" 45, that are hinged to the lower ends of the main portions of the shafts as shown in Fig. 5 so that each may swing downwardly to limited extent, from axial alignment with the mounting leg.

The hinge connection of parts 21 and 45 is best shown in Figs. 4 and 5, wherein 50 designates a plug that is fixed in the lower end of part 21, and 51 is a plug that is fixed in the adjacent end of part 45. The two plugs are equipped, respectively, with hinge ears 52 and 53 that are joined by a hinge pin 54. The ears 53 are beveled as at 55 to engage against a face of plug 50 to limit the downward swing of each part 45 to a definite angle with respect to its mounting leg.

Interposed in each hinge, between the joined parts, as noted in Fig. 4, is a coiled spring 56 which operates to urge the extension members to the angular positions as noted in Fig. 5. This makes possible, upon extending legs 21—21', the engaging of the spuds 45 with stair treads for lifting or lowering a load along a stairway. When the legs are retracted into their mounting members 1 and 1a, the spuds are brought back to axial alignment with the legs.

In lieu of the connection shown between motor 35 and shafts 25—25', this might be accomplished by driving one shaft 25 from the motor shaft and providing a geared connection between shafts 25—25' at any place between their lengths. Or, the motor might be located at the upper end of the frame and connected in various ways with the shafts 25.

An alternative means for adjustment of the extension legs is shown in Figs. 7 and 8, wherein the main frame structure of the truck is shown to comprise the longitudinal opposite side beams of tubular form, designated as 100 and 100a, the truss rods 105 and 105', joined across their lower ends by a toe plate 102, as in the truck of Fig. 1, and between their ends being tied together by the cross straps 108. At its lower end the frame is mounted on a cross axle 103 which is equipped at its ends with ground wheels 104, and at its upper end is equipped with handle portions 110.

Telescopically contained in the side members 100 and 100a are tubular extension legs 121 and 121', substantially like the extension legs of the device previously described, and joined across their lower ends by a cross bar 122 to keep them from rotating. These are adapted to be extended in a manner like the legs 21 and 21' but by a different means.

This means comprises oppositely threaded shafts 125—125' that are contained coaxially within the legs 121—121' to extend from their upper ends and which threaded shafts are rotatably held in bearings 150 that are fixed in the tubular beams 100 and 100a near their handle portions. The shafts 125 are threaded through nuts 155 that are fixed in the corresponding leg members. Thus, by rotation of the shafts 125, 125' in one direction or the other, the legs will be caused to be extended or retracted.

Means for driving the shafts 125—125' is best shown in Fig. 7, wherein 135 designates a reversible electric motor mounted on the frame adjacent the cross axle 103, with its drive shaft 136 extended to the upper end of the truck, where it has a geared connection as at 165 with a cross shaft 166 that is rotatable in supports 167—167' fixed to the handle members. The cross shaft is provided with geared connections at its ends, as at 168, with the ends of shafts 125—125'. Thus, under control of the motor, the legs 121—121' may be extended or retracted.

Control of the motor would in this case be like that of the device of Fig. 1 as previously described; the hand control switch being designated at 141 and its control lever at 142.

The particular advantage of the device resides in the provision of the extension legs, with or without the spuds 45, and the controlled application of power for the extension or retraction of the legs.

Having thus described my invention, what I claim as new therein and desire to secure by Letters Patent is:

1. A truck of the character described comprising a frame structure forming a bed for the support of a load thereon, supporting wheels at the lower end of the bed, a pair of handles at the upper end of the bed, a pair of extension legs telescopically mounted in the frame at opposite sides thereof for extension beyond the lower end of the bed to engage with a supporting surface for lifting that end of the truck, a motor mounted in the truck frame, a pair of threaded feed shafts rotatably mounted in the frame and operable by said motor in unison, and having operative connection with said legs for extending or retracting them in unison to lift or lower the truck as supported thereby.

2. A hand truck of the character described comprising a frame structure including a pair of longitudinally extending, tubular side beams, truck supporting wheels at the lower end of the frame structure and handle members at its upper end, extension legs of tubular form telescopically contained in the tubular side beams for extension from their lower ends into contact with a supporting surface, threaded shafts revolubly and coaxially contained in said side beams and in the said tubular legs, means rotatably mounting said shafts in said beams against endwise movement, nuts fixed in the tubular legs and receiving the threaded shafts therethrough, and power driven means for rotating said threaded shafts for the extending and retracting of said legs.

3. A hand truck as in claim 2 wherein the said threaded shafts have a driving shaft extended between their upper ends and geared thereto to cause them to rotate in unison, and wherein said powered means is operable to drive said shaft.

FREDRICK T. JENKINS.

REFERENCES CITED

The following references are of record in the file of this patent:

UNITED STATES PATENTS

| Number | Name | Date |
| --- | --- | --- |
| 1,442,560 | Fahrney | Jan. 16, 1923 |
| 1,607,851 | Slater | Nov. 23, 1926 |
| 1,654,188 | Phillips | Dec. 27, 1927 |
| 1,660,517 | Milliken | Feb. 28, 1928 |
| 1,885,112 | Jankisz | Nov. 1, 1932 |
| 2,192,396 | Burch | Mar. 5, 1940 |
| 2,337,683 | Rideout | Dec. 28, 1943 |